(12) United States Patent
Chu

(10) Patent No.: US 7,013,944 B2
(45) Date of Patent: Mar. 21, 2006

(54) COMPACT DISK MANUFACTURING MACHINE

(75) Inventor: David Chu, Taoyuan (TW)

(73) Assignee: Automation Design & Manufacturing Technology Co., Ltd., Taipei Shien (TW)

( * ) Notice: Subject to any disclaimer, the term of this patent is extended or adjusted under 35 U.S.C. 154(b) by 157 days.

(21) Appl. No.: 10/796,185

(22) Filed: Mar. 10, 2004

(65) Prior Publication Data

US 2004/0177930 A1 Sep. 16, 2004

(30) Foreign Application Priority Data

Mar. 11, 2003 (TW) .............................. 92203640 U

(51) Int. Cl.
*B32B 31/00* (2006.01)
*G11B 7/26* (2006.01)
*B29C 65/00* (2006.01)
*B29C 65/48* (2006.01)
*B29C 65/56* (2006.01)

(52) U.S. Cl. ...................... 156/538; 156/539; 156/556; 156/557; 156/566; 156/567; 156/578

(58) Field of Classification Search ................ 156/538, 156/539, 556, 557, 566, 567, 580, 581, 578, 156/583.1, 295, 74, 275.3, 275.1, 571, 379.8, 156/286, 382, 392, 498, 497; 264/1.33; 414/223.01, 414/941, 744.1, 217, 744.2, 756, 744.3, 744.4
See application file for complete search history.

(56) References Cited

U.S. PATENT DOCUMENTS 5,240,548 A * 8/1993 Aramaki et al. ............ 156/556
5,378,517 A * 1/1995 Suzuki et al. .............. 428/64.4
5,743,965 A * 4/1998 Nishimura et al. ......... 118/712
5,938,891 A * 8/1999 Kashiwagi et al. ......... 156/578
5,961,777 A * 10/1999 Kakinuma ................ 156/380.9
6,103,039 A * 8/2000 Paulus et al. ............... 156/223
6,224,702 B1 * 5/2001 Kitano et al. ................ 156/74
2003/0070765 A1 * 4/2003 Eichlseder .................. 156/580
2003/0104097 A1 * 6/2003 Matsumoto et al. ........ 425/500
2003/0183342 A1 * 10/2003 Spreizer ..................... 156/382

FOREIGN PATENT DOCUMENTS

| CH | 692642 A5 | * | 8/2002 |
| DE | 19718471 A1 | * | 11/1998 |
| JP | 2001184742 A | * | 7/2001 |
| JP | 2002025125 A | * | 1/2002 |
| JP | 2002245692 A | * | 8/2002 |
| JP | 2004079053 A | * | 3/2004 |

* cited by examiner

*Primary Examiner*—Sue A. Purvis
(74) *Attorney, Agent, or Firm*—Troxell Law Office, PLLC

(57) ABSTRACT

A compact disk (DVD) manufacturing machine is used to laminate first and second DVD substrates to produce a DVD, and mainly includes a glue applicator for applying a glue ring on a laminating surface of each DVD substrate; a DVD laminator for turning the first DVD substrate to the second one at predetermined speeds, allowing the glue rings to contact with each other before the two DVD substrates are slowly laminated; and a rotating element below a fixed sucker of the DVD laminator for rotating the laminated DVD substrates and ensuring even spread of the glue between the two substrates without producing blisters. Since the gluing and the laminating are synchronously performed at two different positions on a turntable of the machine, an increased productivity may be obtained.

5 Claims, 6 Drawing Sheets

COMPACT DISK MANUFACTURING MACHINE

FIELD OF THE INVENTION

The present invention relates to a compact disk (DVD) manufacturing machine, and more particularly to a DVD manufacturing machine that dispenses glue on both DVD substrates and slowly laminates the two glued DVD substrates to ensure even spreading of glue between the two DVD substrates without producing blisters.

BACKGROUND OF THE INVENTION

In producing a compact disk (DVD), two DVD substrates are glue-laminated and exposed to ultraviolet for setting the glue. One of the two DVD substrates has a laminating surface being coated with recordable laminae, while the other DVD substrate is transparent and has a laminating surface without any coating.

In a conventional way for laminating the two DVD substrates, first apply one circle of glue on the laminating surface of one substrate, and then flatly lay the other substrate to the top of the glue-applied substrate, so that the two substrates are laminated. This is the so-called one-surface glue lamination.

As it is known, glue is a positive-ion ultraviolet-hardening compound, and is a material completely different from that for forming the transparent and the laminae-coated substrates. Therefore, when the glue is compressed between two DVD substrates, it is forced to spread between and contact with two different media. Due to the problem of spray galvanizing, the glue flows in unstable directions to result in uneven distribution of the glue. In a severer condition, blisters are produced to form defects in the manufacturing process.

It is apparently desirable to develop an improved DVD manufacturing machine to eliminate the problems existed in the conventional way of producing a compact disk through one-surface glue lamination, and to increase the rate of good yield of completed compact disks.

SUMMARY OF THE INVENTION

The present invention provides a DVD manufacturing machine that dispenses two glue rings on the laminating surfaces of both DVD substrates, so that the two DVD substrates are firmly laminated through contacting between the two glue rings that are of the same medium, and a surface tension between the two glue rings enables the glue to evenly spread. The machine of the present invention also includes a DVD laminator controlled via a plc procedure to slowly move two DVD substrates toward each other, so that the two glue rings contact first and are then slowly compressed and combined to laminate the two DVD substrates. The laminated DVD substrates are also rotated to ensure even distribution of the combined glue without producing blisters.

The machine of the present invention mainly includes a turntable having eight DVD seats. The turntable is circumferentially moved by a distance equal to two DVD seats each time it is turned, so that glue application and DVD substrate lamination can be performed synchronously to increase the productivity.

The present invention includes a DVD laminator having a movable and a fixed sucker. The movable sucker is screwed to three angles of a triangular fixing plate via three finely adjustable screws, so that the first DVD substrate sucked to the movable sucker may always be parallel with the second DVD substrate sucked to the fixed sucker during the glue lamination.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
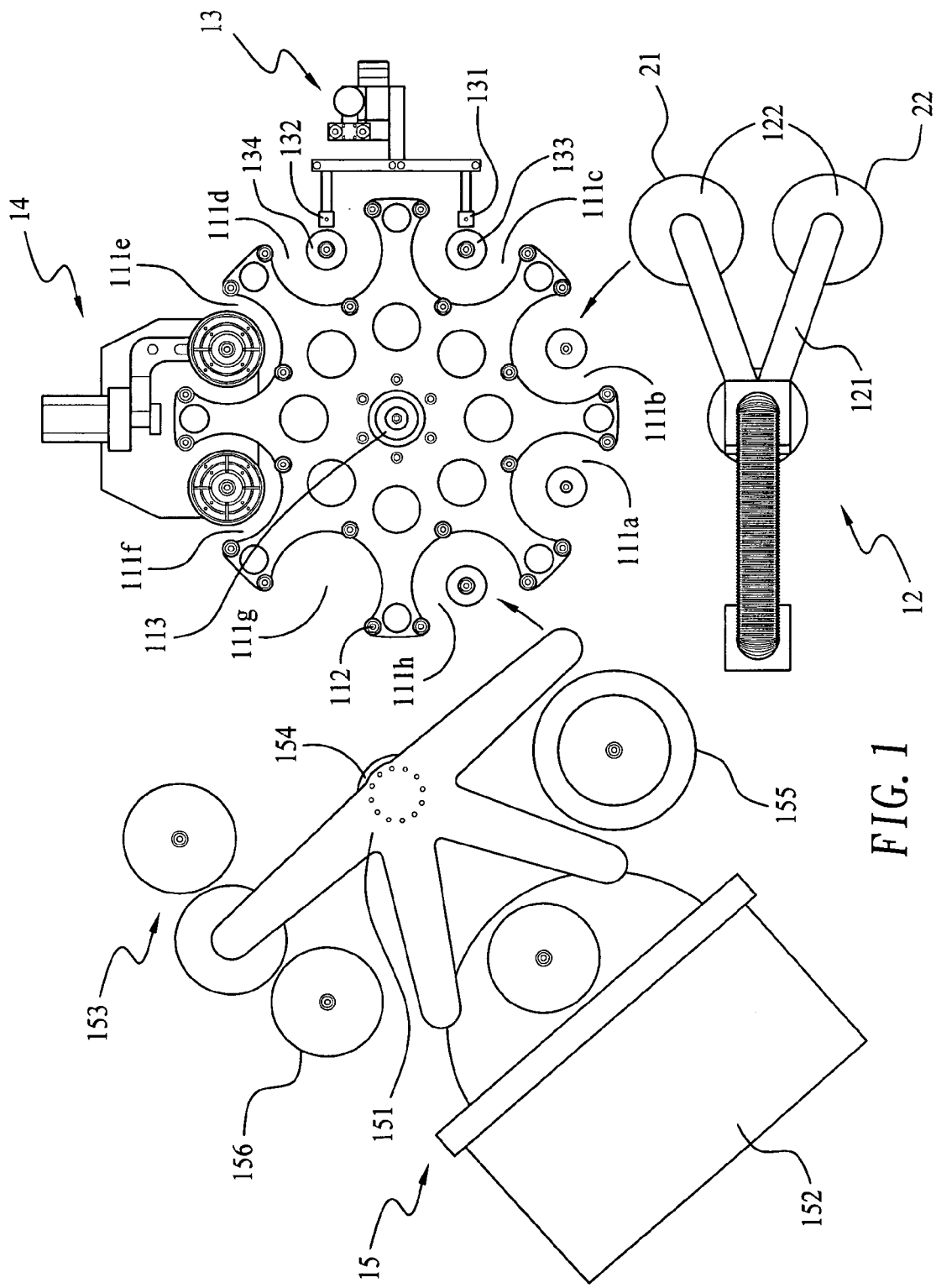
FIG. 1 is a plan view showing the layout of a compact disk (DVD) manufacturing machine according to the present invention.

Please refer to FIG. 1 that is a plan view of a compact disk (DVD) manufacturing machine according to the present invention. As shown, the machine includes a turntable 11, a DVD substrate feeder 12, a glue applicator 13, a laminator 14, and a DVD collecting station 15.

The turntable 11 has eight open-side circular DVD seats 111 equally spaced along a circumference of the turntable 11, and is controlled via a central shaft 113 to turn and vertically move upward and downward. Each circular DVD seat 111 has an inner diameter smaller than an outer diameter of a DVD substrate for forming the compact disk, and is provided along an inner rim with three raised points 112 for supporting a DVD substrate thereon.

The DVD substrate feeder 12 includes two cantilever arms 121 adapted to simultaneously suck a first and a second DVD substrate 21, 22 from a substrate feed zone 122, and then turn to locate above the turntable 11 and lay the first and the second DVD substrates 21, 22 on the first and the second circular DVD seat 111a, 111b, respectively. The first DVD substrate 21 is a light-transmissible substrate, and the second DVD substrate 22 has recordable laminae provided thereon.

Figure 2:
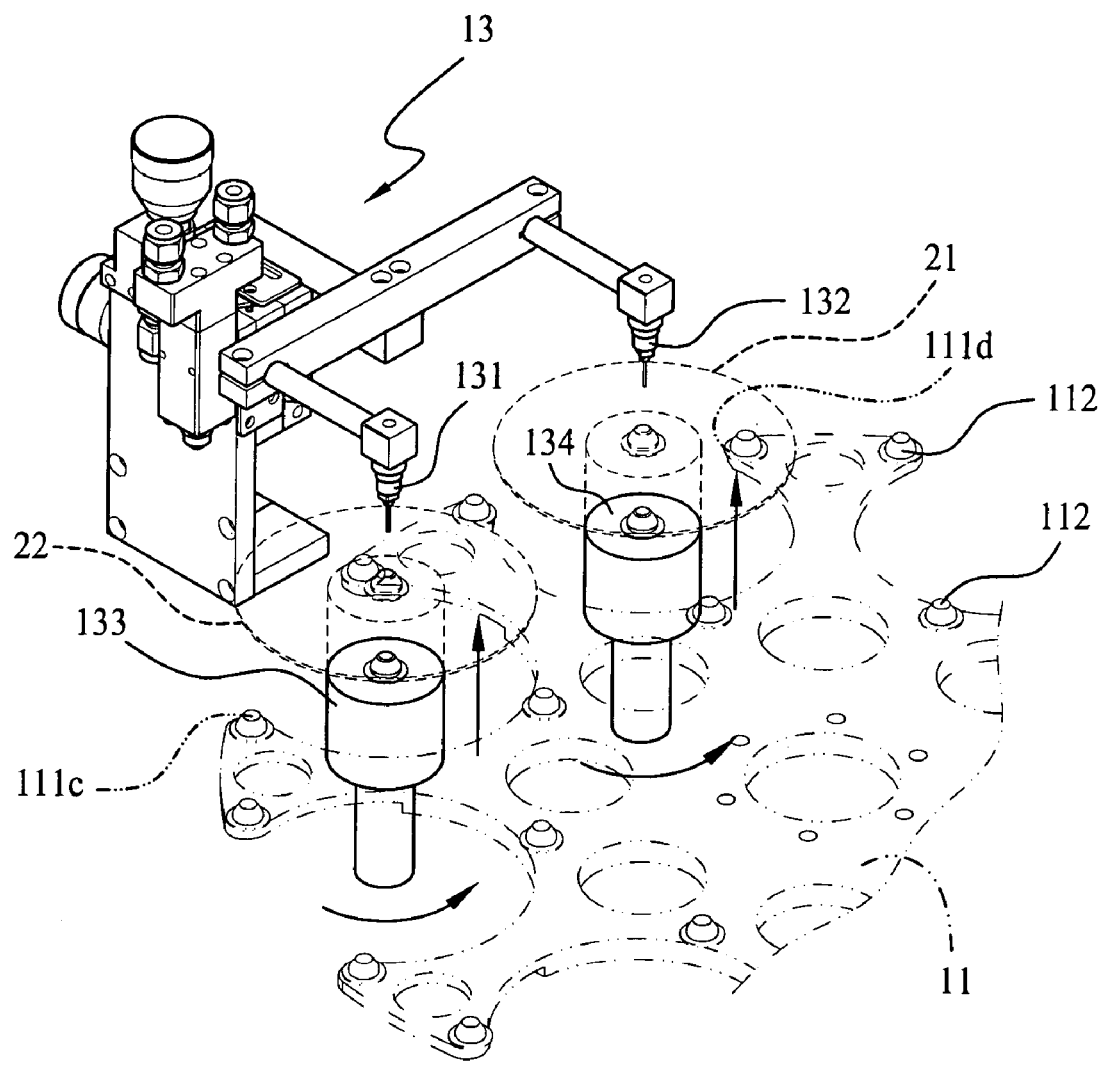
FIG. 2 is a fragmentary perspective view showing a glue applicator included in the DVD manufacturing machine of the present invention.

Please refer to FIGS. 1 and 2 at the same time. The glue applicator 13 includes two nozzles 131, 132 located above the third and the fourth circular DVD seat 111c, 111d, respectively, and two rotatable elevating heads 133, 134 located below the turntable 11 to elevate the DVD substrates 21, 22 on the third and the fourth DVD seat 111c, 111d to locate them closely below the two nozzles 131, 132. When the elevating heads 133, 134 are rotated, glue is supplied via the nozzles 131, 132 to form a raised glue ring on each of the DVD substrates 21, 22.

Figure 3:
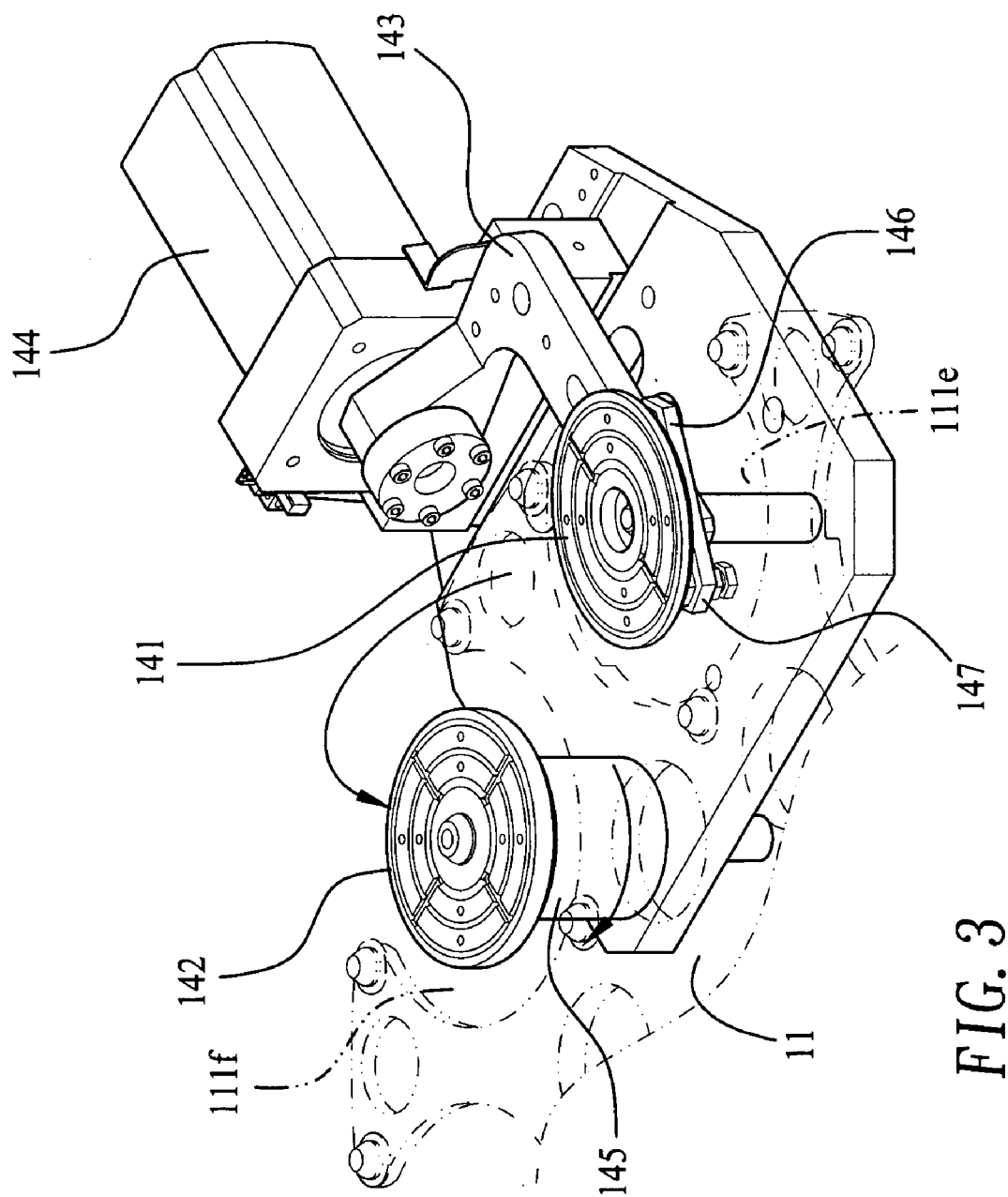
FIG. 3 is a fragmentary perspective view showing a DVD laminator included in the DVD manufacturing machine of the present invention.

Please refer to FIGS. 1 and 3 at the same time. The DVD laminator 14 includes two suckers 141, 142 located below the fifth and the sixth circular DVD seat 111e, 111f, respectively, of the turntable 11. The first sucker 141 is mounted on a pivoted arm 143 and therefore a movable sucker, and the second sucker 142 is a fixed sucker fixedly mounted on the DVD laminator 14. The pivoted arm 143 is driven by a motor 144 to turn, so that the movable sucker 141 mounted thereon may be turned by 180 degrees to locate immediately above the fixed sucker 142 to laminate the first and the second DVD substrate 21, 22 that are sucked to the two suckers 141, 142, respectively. A rotating element 145 is provided below the fixed sucker 142 and rotates when the first and the second DVD are initially laminated, so that the two DVD substrates 21, 22 are subject to pressure and tightly attached to each other.

The DVD collecting station 15 includes a rotatable four-claw arm 151, an ultraviolet setting zone 152, and a DVD collecting zone 153. The four-claw arm 151 is rotatable about a rotary shaft 154, so that the first claw thereof is able to suck a completed DVD from the last circular DVD seat 111h of the turntable 11. The sucked DVD is moved through a high-speed rotating disk 155 before it is sent into the ultraviolet setting zone 152 for the glue between the two DVD substrates 21, 22 to set. The DVD in the ultraviolet setting zone 152 is then sent to a quality inspection zone 156 using the third claw, and the qualified DVD is finally sent to the collecting zone 153 by the fourth claw.

Figure 4A:
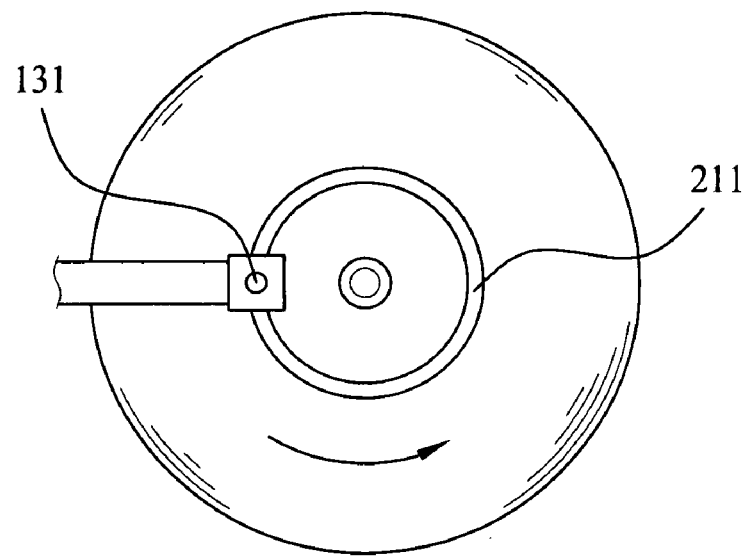
FIG. 4A schematically shows the application of glue on a DVD substrate.
Figure 4B:
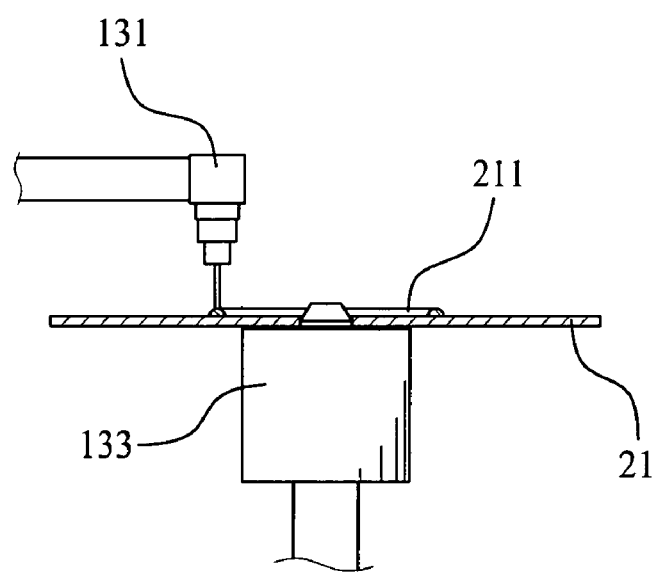
FIG. 4B is a sectional view of FIG. 4A.

The operation of the whole DVD manufacturing machine of the present invention is controlled using a plc procedure. First, the DVD substrate feeder 12 fetches the first and the second DVD substrate 21, 22 from the substrate feed zone 122, and the two cantilever arms 121 are turned to locate the fetched first and second DVD substrates 21, 22 on the top of the first and the second open-side circular DVD seat 111a, 111b, respectively. Then, the turntable 11 is turned about the central shaft 113 for the first and the second DVD seat 111a, 111b to move into positions corresponding to the original third and fourth DVD seats 111c, 111d. At this point, allow the two elevating heads 133, 134 of the glue applicator 13 below the turntable 11 to elevate, so that a laminating surface of both the first and the second DVD substrate 21, 22 for gluing are located immediately below the nozzle 131, 132, respectively, as shown in FIG. 4B. Control the elevating heads 133, 134 for the two DVD substrates 21, 22 to rotate by one or more turns, so that both the DVD substrates 21 and 22 have a raised glue ring 211 formed on their respective laminating surface, as shown in FIGS. 4A and 4B.

At the completion of glue application on both the first and the second DVD substrate 21, 22 simultaneously, the elevating heads 133, 134 are lowered, and the turntable 11 is rotated again to move forward by a distance equal to two circular DVD seats. That is, the first and the second DVD substrate 21, 22 having been applied with glue are moved from the positions corresponding to the original DVD seats 111c, 111d to next two positions corresponding to the original DVD seats 111e, 111f and the DVD laminator 14 for glue lamination of the two DVD substrates 21, 22.

When the two DVD substrates 21, 22 are located at the DVD seats 111e, 111f, the motor 144 of the DVD laminator 14 is started to turn the pivoted arm 143 in a direction indicated by the arrow in FIG. 3, so that the first DVD substrate 21 sucked to the movable sucker 141 is turned toward the second DVD substrate 22, which is sucked to the fixed sucker 142, causing the two DVD substrates 21, 22 to become laminated. After the two DVD substrates 21, 22 are laminated, the rotating element 145 below the fixed sucker 142 is actuated to rotate the laminated DVD on the fixed sucker 142, so that the glue rings between the two DVD substrates 21, 22 are evenly distributed between the laminating surfaces of the two DVD substrates 21, 22. By applying a predetermined pressure against the laminated DVD, the lamination of the DVD substrates 21, 22 is completed at the DVD seat 111f.

Thereafter, turn the turntable 11 forward again by a distance equal to two DVD seats, so that the laminated DVD at the DVD seat 111f is sent to a position corresponding to the last DVD seat 111h. It is noted the last DVD seat 111h has a downward retractable central post.

When the laminated DVD is sent to the last DVD seat 111h, the four-claw arm 151 of the DVD collecting station 15 is rotated about the rotary shaft 154 for the first claw to locate above the DVD seat 111h, extend its clamping claws into a central hole of the laminated DVD, and stretch the clamping claws. At this point, the central post of the last DVD seat 111h is downward retracted, allowing the first claw to clamp the DVD. The four-claw arm 151 is then turned backward to send the clamped DVD to the high-speed rotating disk 155, at where the DVD is sucked in place and rotated at high speed to control the thickness of glue between the two DVD substrates and throw out extra glue. The thrown-out glue is collected and recycled. The second claw of the four-claw arm 151 is used to suck the DVD and moves it from the high-speed rotating disk 155 to the ultraviolet setting zone 152, at where the DVD is exposed to ultraviolet ray to set the glue between the two DVD substrates. Thereafter, the DVD is sent to the quality inspection zone 156 and collected either at a defective product zone or a DVD collecting zone 153 to complete the process for manufacturing the compact disk.

What is to be noted is the glue applicator 13 of the present invention includes two nozzles 131, 132 for dispensing glue and forming the glue rings on the first and the second DVD substrate at the same time. Please refer to FIG. 5. With the dispensation of glue on the laminating surfaces of the two DVD substrates at the same, it is the glue rings 211, 221 on the first and the second DVD substrate 21, 22, respectively, that first get in contact with each other when the first DVD substrate 21 is turned toward and compressed against the second DVD substrate 22. When the two DVD substrates 21, 22 are slowly compressed against one another, a surface tension of the glue causes the glue rings 211 and 221 to evenly spread between the first and the second DVD substrate 21, 22.

Figure 5:
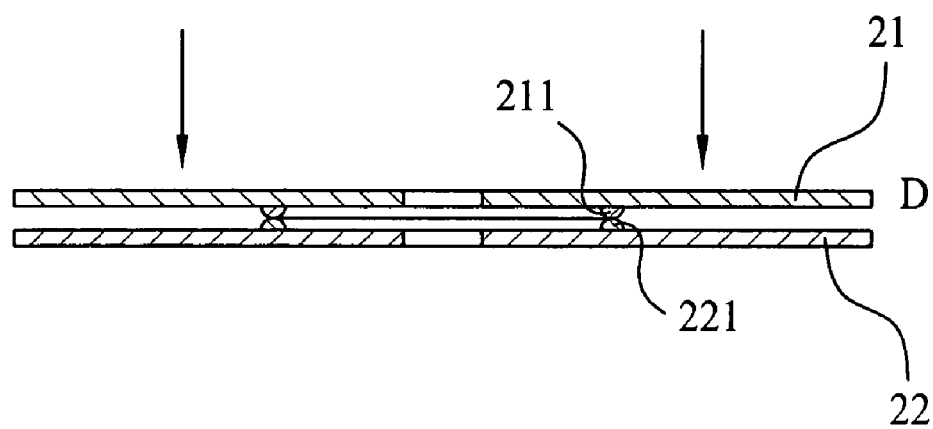
FIG. 5 shows it is the glue applied on first and second DVD substrates that first get in touch with each other in the process of laminating the two substrates.
Figure 6:
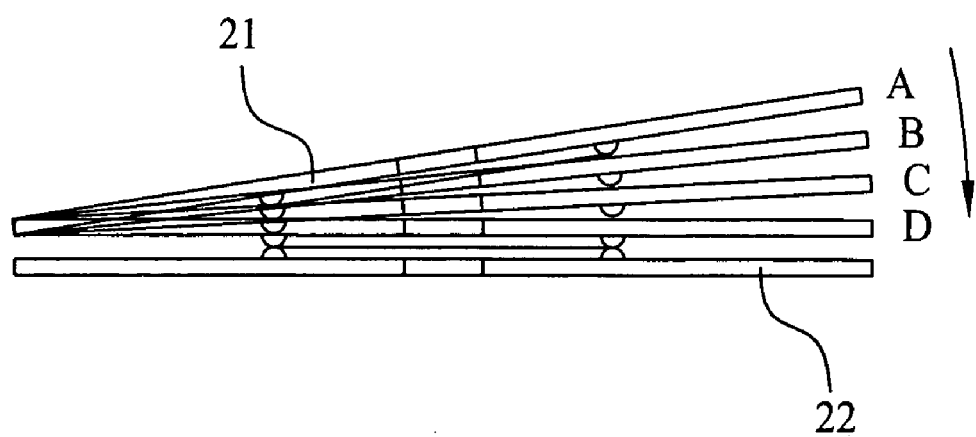
FIG. 6 shows different moving points of a pivoted arm of the DVD laminator.

Please further refer to FIG. 6 that schematically shows different moving points of the first DVD substrate 21 turned by the pivoted arm 143 of the DVD laminator 14 in the process of laminating the first DVD substrate 21 and the second DVD substrate 22. In the illustrated drawing, only four moving points A, B, C, and D are shown for the purpose of explanation, and four planes at different inclinations represent four different positions of the laminating surface of the first DVD substrate 21 relative to the second DVD substrate 22. To laminate the first and the second DVD substrate 21, 22, first pivotally turn the first DVD substrate 21 by 179 degrees to the position A at a high turning speed, and the turning speed is slowed down just before the first DVD substrate 21 is about to contact with the second DVD substrate 22. When the first DVD substrate 21 is further turned downward to, for example, an angle of 179.5 degree at the position B, the two glue rings 211 and 221 are initially in contact with each other. At this point, the turning speed is slowed down again. When the first DVD substrate 21 is further turned to, for example, an angle of 179.9 degrees at the position C, the two DVD substrates 21, 22 are finally laminated. At this point, allow the two DVD substrates to stay in this position for a period of time, so that the two glue rings 211, 221 are fully and evenly combined together without producing blisters in the glue. The first DVD substrate 21 is then slowly pressed to the position D, that is, a plane at the angle of 180 degrees, as shown in FIG. 5. At this point, the rotating element 145 below the fixed sucker 142 is actuated to rotate the fixed sucker 142, ensuring the glue is absolutely evenly spread between the two DVD substrates 21, 22.

In the above-described manner, since it is the two glue rings having the same properties that first come in touch with each other in the process of lamination, and the first and the second DVD substrate 21, 22 are laminated in a very slow motion, the glue may be very evenly spread between the two laminating surfaces without producing any blister. This largely upgrades the good yield of the manufactured DVD, as compared to that in the conventional DVD manufacturing technique that applies glue to only one laminating surface on one DVD substrate.

Figure 7:
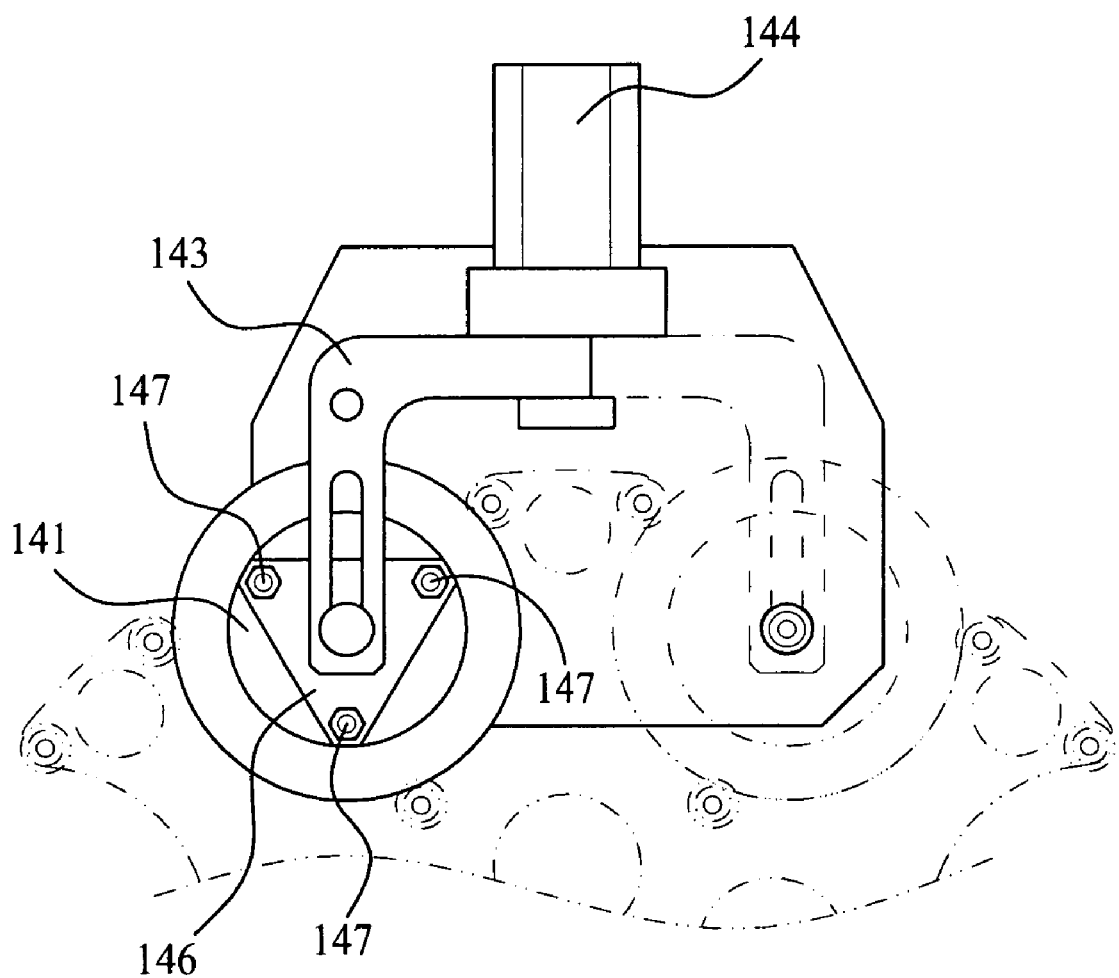
FIG. 7 is a bottom plan view of a movable sucker on the DVD laminator.

FIG. 7 is a bottom plan view of the movable sucker 141 of the DVD laminator 14. Please refer to FIGS. 3 and 7 at the same time. A triangular plate 146 is provided between the pivoted arm 143 and the movable sucker 141, and has three adjusting screws 147 provided at three angles thereof. By finely adjusting the three adjusting screws 147, a parallelism between the sucker 141 and the fixed sucker 142 may be adjusted, so that the movable sucker 141 may always be turned to the fixed sucker 142 by the pivoted arm 143 with the laminating surface of the first DVD substrate 21 always in parallel with the laminating surface of the second DVD substrate 22.

The present invention has been described with a preferred embodiment thereof and it is understood that many changes and modifications in the described embodiment, such as mounting the DVD feeder, the glue applicator, the DVD laminator, and the DVD collecting station in reverse order to match the need in an erection site of the machine, or mounting the two elevating heads in reverse direction, or changing the shape of the triangular plate of the DVD laminator, can be carried out without departing from the scope and the spirit of the invention that is to be limited only by the appended claims.

What is claimed is:

1. A compact disk (DVD) manufacturing machine, comprising:
  a turntable having eight open-side circular DVD seats, and being controlled via a central shaft to rotate and move upward and downward; and said turntable being circumferentially moved by a distance equal to two said circular DVD seats each time said turntable is rotated;
  a DVD feeder adapted to simultaneously fetch a first and a second DVD substrate from a substrate feed zone, and lay said first and said second DVD substrate on two adjacent DVD seats on said turntable in the vicinity of said DVD feeder;
  a glue applicator including two nozzles for dispensing glue separately located above two of said DVD seats that sequentially follow said two DVD seats in the vicinity of said DVD feeder, and two elevating he ads separately located below said two subsequent DVD seats;
  a DVD laminator including a movable sucker mounted on a pivoted arm pivotally rotatable by a motor, and a fixed sucker; said two suckers being located below two of said DVD seats that sequentially follow said two DVD seats in the vicinity of said glue applicator, and adapted to suck and laminate said first and said second DVD substrate; and
  a DVD collecting station for drying glue dispensed by said glue applicator between said first and said second DVD substrate, and collecting a compact disk obtained from said first and second DVD substrates laminated at said DVD laminator;
  said glue applicator being adapted to apply glue on said first and said second DVD substrate at the same time, so as to form a raised glue ring on a laminating surface of each of said first and second DVD substrates; and
  said DVD laminator being adapted to pivotally turn said first DVD substrate toward said second DVD substrate at a high speed, and then slow down before said first DVD substrate gets in touch with said second DVD substrate to allow said glue rings on said laminating surfaces of said two DVD substrates to contact with each other first, and then slow down again for said two DVD substrates to laminate; and
  said DVD laminator including a rotating element located below said fixed sucker and adapted to rotate said laminated DVD substrates to ensure even spreading and distribution of said applied glue between said two DVD substrates without producing blisters.

2. The DVD manufacturing machine as claimed in claim 1, wherein said DVD collecting station includes a four-claw arm, an ultraviolet setting zone, a high-speed rotating disk, a DVD quality inspection zone, and a DVD collecting zone; said four-claw arm being pivotally rotatable about a rotary shaft, so that a first claw of said four-claw arm is adapted to suck said laminated DVD laid in the last one of said DVD seats on said turntable, and send said laminated DVD to said high-speed rotating disk, at where said laminated DVD is sucked in place and turned at a high speed to control a thickness of said glue between said two DVD substrates, and extra glue is thrown out and collected for recycling; said laminated DVD at said high-speed rotating disk being fetched by a second claw of said four-claw arm to said ultraviolet setting zone for said glue to set under ultraviolet rays to provide a finished DVD; and said finish DVD being sent to said quality inspection zone by said four-claw arm and then collected either at a defective product zone or said DVD collecting zone.

3. The DVD manufacturing machine as claimed in claim 1, wherein said elevating heads of said glue applicator are adapted to elevate said first and said second DVD substrate on said DVD seats of said turntable, so that said laminating surfaces of said two DVD substrates are located just below said two nozzles; and said elevating heads being adapted to rotate said DVD substrates supported thereon, so that said glue dispensed by said nozzles on said laminating surfaces form said two raised glue rings.

4. The DVD manufacturing machine as claimed in claim 1, wherein said movable sucker of said DVD laminator is mounted on a fixing plate connected to said pivoted arm, said movable sucker being adjustably connected to a top of said fixing plate by three adjusting screws located at three angles of a triangle on said fixing plate, so that said first DVD substrate sucked to said movable sucker is always in parallel with said second DVD substrate sucked to said fixed sucker when being laminated to said second DVD substrate.

5. The DVD manufacturing machine as claimed in claim 4, wherein said fixing plate of said DVD laminator is an adjustable fixing plate.

* * * * *